US012195997B2

(12) United States Patent
Kuhnke et al.

(10) Patent No.: US 12,195,997 B2
(45) Date of Patent: Jan. 14, 2025

(54) CASEMENT LOCK FOR LOCKING A DOOR

(71) Applicant: EMKA BESCHLAGTEILE GMBH & CO. KG, Velbert (DE)

(72) Inventors: Thorsten Kuhnke, Mettmann (DE); Turgay Alan, Remscheid (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 249 days.

(21) Appl. No.: 17/773,289

(22) PCT Filed: Oct. 21, 2020

(86) PCT No.: PCT/DE2020/100908
§ 371 (c)(1),
(2) Date: Apr. 29, 2022

(87) PCT Pub. No.: WO2021/083456
PCT Pub. Date: May 6, 2021

(65) Prior Publication Data
US 2023/0265679 A1 Aug. 24, 2023

(30) Foreign Application Priority Data
Oct. 31, 2019 (DE) ......................... 102019129440.1

(51) Int. Cl.
*E05B 17/00* (2006.01)
*E05C 3/10* (2006.01)
*E05C 5/02* (2006.01)

(52) U.S. Cl.
CPC ............ *E05B 17/0025* (2013.01); *E05C 3/10* (2013.01); *E05C 5/02* (2013.01)

(58) Field of Classification Search
CPC .......... E05B 17/0025; E05B 9/08; E05C 5/02; E05C 5/042; E05C 3/10; E05C 3/042; Y10T 292/0887; Y10T 292/0876
See application file for complete search history.

(56) References Cited

U.S. PATENT DOCUMENTS 4,583,775 A * 4/1986 Bisbing .................. E05C 3/042 292/64
4,688,835 A * 8/1987 Wu ......................... E05B 83/01 292/59
(Continued)

FOREIGN PATENT DOCUMENTS

CN 101283154 A * 10/2008 ............. E05B 17/04
CN 103031998 A * 4/2013 ............. E05B 15/00
(Continued)

OTHER PUBLICATIONS

DE202004019692U1 Apr. 14, 2005 Espacenet machine translation description and claims (Year: 2024).*
(Continued)

*Primary Examiner* — Christine M Mills
*Assistant Examiner* — Steven A Tullia
(74) *Attorney, Agent, or Firm* — Thompson Hine LLP

(57) ABSTRACT

A casement lock for locking a door, the casement lock having a casement lock housing, an actuation element rotatably mounted on the casement lock housing, and a locking element which is coupled with the actuation element and can be translationally moved in a first angular range of the actuation element and rotationally moved in a second angular range of the actuation element, the actuation element being axially secured by securing means in the first angular range and being axially released by the securing means in the second angular range.

16 Claims, 6 Drawing Sheets

(56) References Cited

U.S. PATENT DOCUMENTS

| | | | | | |
|---|---|---|---|---|---|
| 4,763,935 | A * | 8/1988 | Bisbing | E05B 17/0025 292/DIG. 60 |
| 6,568,226 | B1 * | 5/2003 | Ramsauer | E05C 3/042 292/114 |
| 6,640,592 | B2 * | 11/2003 | Vickers | E05B 17/04 292/64 |
| 6,843,082 | B2 * | 1/2005 | Vickers | E05C 5/00 292/64 |
| 7,441,427 | B2 * | 10/2008 | Vickers | E05B 35/008 292/64 |
| 8,746,022 | B2 * | 6/2014 | Francois | E05C 5/02 70/379 R |
| 11,131,115 | B2 * | 9/2021 | Carabalona | E05B 11/02 |
| 11,359,421 | B2 * | 6/2022 | Runge | E05B 17/0025 |
| 2004/0103701 | A1 * | 6/2004 | Vickers | E05B 17/04 70/83 |
| 2019/0063112 | A1 | 2/2019 | Carabalona | |
| 2023/0265679 | A1 * | 8/2023 | Kuhnke | E05C 5/02 292/64 |

FOREIGN PATENT DOCUMENTS

| | | | | |
|---|---|---|---|---|
| CN | 103154409 | | 6/2013 | |
| CN | 108350704 | | 7/2018 | |
| CN | 108699857 | | 10/2018 | |
| CN | 109923272 | | 6/2019 | |
| DE | 2339186 | A1 | 2/1975 | |
| DE | 9104325 | U1 * | 9/1992 | E05C 3/042 |
| DE | 298 23 846 | U1 | 1/1998 | |
| DE | 29805849 | U1 | 6/1998 | |
| DE | 19803372 | A1 | 8/1999 | |
| DE | 19814297 | A1 | 10/1999 | |
| DE | 29820711 | U1 * | 3/2000 | E05B 17/0025 |
| DE | 202004019692 | U1 * | 5/2005 | E05B 17/0025 |
| DE | 202005005774 | U1 * | 7/2005 | E05C 3/042 |
| DE | 202005016995 | U1 * | 2/2006 | E05B 9/084 |
| DE | 202008002511 | U1 * | 6/2008 | E05B 9/086 |
| DE | 202010012699 | U1 * | 1/2011 | E05B 17/0025 |
| DE | 202013104526 | U1 | 12/2013 | |
| EP | 0905340 | A1 | 3/1999 | |
| EP | 1131521 | B1 * | 12/2002 | E05B 17/0025 |
| EP | 1411198 | A1 * | 4/2004 | E05C 5/02 |
| EP | 1722050 | A1 | 11/2006 | |
| EP | 1722050 | B1 | 8/2007 | |
| EP | 1073815 | B1 * | 10/2008 | E05B 17/04 |
| EP | 3372755 | A1 * | 9/2018 | E05B 1/0092 |
| EP | 3516136 | B1 * | 2/2020 | E05B 17/0025 |
| GB | 2485190 | A * | 5/2012 | E05B 17/0025 |
| KR | 20140046747 | A * | 10/2012 | E05C 5/02 |
| WO | 2009/043420 | A1 | 4/2009 | |
| WO | WO-2009103414 | A1 * | 8/2009 | E05B 9/086 |
| WO | WO-2018054450 | A1 * | 3/2018 | E05B 17/0025 |
| WO | 2021/083456 | A1 | 5/2021 | |

OTHER PUBLICATIONS

International Search Report (PCT) issued by the European Patent Office acting as International Searching Authority for International Patent Application No. PCT/DE2020/100908 dated Jan. 29, 2021 (5 total pages).

English Translation of International Preliminary Report on Patentability and Written Opinion issued by the European Patent Office acting as International Searching Authority for International Patent Application No. PCT/DE2020/100908 dated May 12, 2022, 6 pages.

* cited by examiner

A-A

A-A

A-A

CASEMENT LOCK FOR LOCKING A DOOR

TECHNICAL FIELD

The present disclosure relates to closure locking mechanisms and more particularly to casement locking mechanisms for locking a closure.

BACKGROUND

Casement locks are used in many technological fields for locking doors, wherein, in association with the present application, the term "door" is intended to encompass not only doors in the strict sense but also all types of lockable closing elements, such as in particular windows, hatches, flaps, covers, etc.

Known casement locks have a fixed casement lock housing, via which the casement lock can be fastened to the door. An actuating element which is mounted rotatably on the casement lock housing is coupled to a likewise rotatably mounted locking element such that the door, through rotation of the actuating element between its open and closed positions, can be correspondingly opened or locked.

In casement locks of structurally simple design, the coupling of the actuating element to the locking element is rigid, so that the locking element always follows the movements of the actuating element.

Beside said casement locks of structurally simple design with rigid coupling, casement locks in which the locking element, in addition to its rotational movement, is also moved in a translational manner along its axis of rotation are also known. Casement locks of said type are used in particular in applications in which reliable sealing of the closed door is intended to be realized through compression of a door seal which consists of a rubber-elastic material. In the case of said casement locks, the translational movement of the locking element is used to compress the door seal in a defined manner. Casement locks of this type are therefore commonly also referred to as "turn-and-brace locks".

In order to open the door locked by such a casement lock, the actuating element is rotated in an opening direction. During this actuation, the locking element moves, in a first angular range of the actuating element, firstly in a translational manner, whereby the compression of the seal clamped between the door frame and the door leaf is eliminated or at least reduced. In the next step, the locking element, upon further actuation of the actuating element in a second angular range, is moved in a rotational manner into its open position, whereby the door is correspondingly released and the door leaf can be pivoted with respect to the door frame.

Although casement locks of this type are distinguished by good closing properties, the construction thereof is complex in part and also not suitable for all applications.

German patent document No. DE 10 2019 102 411 relates for example to a casement lock which is of complex configuration in terms of construction and in which the actuating element, the casement lock housing and the locking element, for the purpose of achieving the desired turn-and-brace functionality, are connected to one another via multiple threads.

However, via the corresponding threaded connections, not only the desired turn-and-brace functionality is achieved. Via the self-locking action of the thread, it is also achieved that the components which are arranged so as to be movable with respect to the fixed casement lock housing of the casement lock are axially secured in every position, so that, for example, different pressure conditions on the inner and outer sides of the casement lock cannot lead to an undesired axial movement of the locking element and thus at least partial opening of the door. In order to give feedback to the user about the closing state of the door, the threaded connection between the actuating element and the casement lock housing, as a result of which threaded connection the actuating element moves axially with respect to the casement lock housing during the actuation, is moreover used as an opening indicator. For this purpose, the spacing of the actuating element to the casement lock housing, which spacing changes according to the opening or closing position of the casement lock, is indicated via an indicator ring which is in a signal color.

Even though the user receives, through the axial movement of the actuating element, good feedback about the closing state of the casement lock, the axial movement with respect to the casement lock housing has turned out to be problematic for some applications. This is because, owing to said movement, there is the risk of impurities, dust, dirt or the like being introduced into the casement lock housing from the outside, which is a problem especially in applications in the hygiene sector, such as for example in the medical sector or food sector.

SUMMARY

The disclosed casement lock is therefore based on the object of providing a casement lock which is suitable for applications in the hygiene sector and which is distinguished by a simple construction.

Said object is achieved in the case of a casement lock of the type mentioned in the introduction in that the actuating element is, with respect to the casement lock housing, in a state axially secured via a securing means in the first angular range and in a state axially released via the securing means in the second angular range.

This configuration results in a casement lock with a turn-and-brace function that is simple in terms of construction and that can be readily used even in the hygiene sector. Owing to the securing of the actuating element with respect to the casement lock housing, the actuating element cannot be moved axially with respect to the casement lock housing in the first angular range. The rotation of the actuating element can therefore be transferred into a translational movement of the locking element without the actuating element, with the associated hygiene problems, moving axially with respect to the casement lock housing. In the second angular range, it is not necessary for the actuating element to be secured axially with respect to the casement lock housing since, in this angular range, axial securing can be realized indirectly via the rotational movement of the locking element. Moreover, the axial release of the actuating element in the second angular range allows, in comparison with a design in which the actuating element is axially secured over its entire actuation angle, a significantly simplified construction and also improved assembly properties.

An advantageous refinement of the invention provides that the actuating element is coupled to the locking element via a coupling shaft. The coupling shaft couples the actuating element to the locking element in such a way that the movement of the actuating element can be transmitted in a structurally simple manner to the locking element.

In this regard, it has turned out to be advantageous for the coupling shaft to be connected rigidly to the locking element. In this way, transmission of the movement of the coupling shaft to the locking element can be ensured in a structurally simple manner. In the case of such a rigid connection, the locking element performs the movement with the coupling shaft. In such a configuration of the connection, the coupling shaft, with the locking element, can be moved in relation to the actuating element for the purpose of producing the translational movement. In this case, the coupling between coupling shaft and locking element may be of force-fitting, form-fitting and/or materially bonded form. In particular, it may be advantageous if the locking element is arranged in a form-fitting manner on the coupling shaft and then secured. It is for example conceivable that the locking element is plugged in a form-fitting manner onto the coupling shaft and is then secured by a screw. Such a configuration makes it possible in particular for the locking element to be quickly fitted to and removed from the coupling shaft.

A particularly advantageous refinement of the invention furthermore provides that, for the purpose of generating the translational and rotational movement of the locking element, the actuating element is coupled to the coupling shaft via a mechanism. In this way, the rotational movement of the actuating element can be transferred into the translational movement and into the rotational movement of the locking element. Moreover, the mechanism may be configured in such a way that the movement of the actuating element can be transferred in a boosting or reducing manner. In this respect, it is conceivable that an actuation of the actuating element in the second angular range is converted in a one-to-one manner into a rotational movement of the locking element. If, for example, the actuating element is rotationally actuated through 90°, then the locking element is correspondingly pivoted through 90°.

In relation to the mechanism, it has proven to be advantageous if the mechanism has an actuating-element-side first mechanism part and a coupling-shaft-side second mechanism part. This allows a structurally simple kinematic connection between the actuating element and the coupling shaft to be achieved. It is in this case possible for the first mechanism part to perform the rotational movement of the actuating element and for the second mechanism part to perform the translational and rotational movements of the locking element.

Furthermore, it is advantageous if the first mechanism part is in the form of a guide slot and the second mechanism part is in the form of a driver which can be moved via the guide slot. An oblique arrangement of the guide slot in relation to the axis of rotation of the actuating element, which is in a state axially secured via the securing means in this angular range, makes it possible for the driver to be moved axially. During rotational movement of the actuating element, the guide slot, which runs around obliquely in relation to the axis of rotation of the actuating element, can be correspondingly moved in a rotational manner over the axially movable driver. Particularly advantageously, the guide slot may be formed in such a way that the driver and the guide slot are moved relative to one another in the first angular range and jointly with one another in the second angular range. Furthermore, it is advantageous for the driver to be connected to the coupling shaft such that the latter can be correspondingly driven by the driver and is correspondingly moved along with the driver. The driver may in particular be in the form of a plug-in bolt. The guide slot may in particular be of helical form.

In this regard, it has furthermore turned out to be advantageous for the first mechanism part to be formed as an integral feature of the actuating element and for the second mechanism part to be arranged on the coupling shaft. This can make possible a particularly simple assembly of the casement lock since it results in a small number of parts of the casement lock combined with low assembly outlay. It is possible that, during the assembly, the second mechanism part, when being arranged on the coupling shaft, is simultaneously connected to the second mechanism part, so that an additional work step can be eliminated.

For a hygienic design of the casement lock, it has turned out to be advantageous if the mechanism is arranged completely within the casement lock housing. In this way, the mechanism can be protected from external influences, such as in particular dust and moisture. In this regard, it is possible in particular for the mechanism to be arranged within the casement lock housing also after translational and rotational movement of the locking element has been realized.

It has furthermore advantageously proven to be effective if the coupling shaft is preloaded with respect to the actuating element via a spring, in particular a compression spring. The preloading can provide for play-free transmission of the movement of the actuating element to the coupling shaft. The spring may in particular be in the form of a compression spring, since in this way the preloading between coupling shaft and actuating element can be achieved in a structurally simple manner. The preloading of the spring may particularly advantageously act in an axial direction of the casement lock, in particular in an axial direction of the actuating element and of the coupling shaft.

A further advantageous refinement of the invention provides that the casement lock has a pin guide for translational guidance of the locking element in the first angular range of the actuating element. By way of the pin guide, it can, in a structurally simple manner, be achieved that the locking element is guided in a translational manner in the first angular range. Rotational movement is prevented.

In relation to the configuration of the pin guide, it has proven to be effective if the pin guide has a guide pin which is arranged on the coupling shaft and which is oriented transversely to the shaft axis thereof. The coupling shaft serves for the transmission of the movement of the actuating element to the locking element. The guide pin, which is arranged on the coupling shaft, allows the locking element to be guided in a translational manner in the first angular range in that the coupling shaft, which is connected to the locking element, is guided in a translational manner. In this case, the guide pin, which is oriented transversely to the shaft axis, may be formed for example as part of the coupling shaft.

In this regard, it is furthermore advantageous if the guide pin engages into a pin groove of the casement lock housing in the first angular range. By way of the guide pin, which is guided in the pin groove, the pin guide can, with little additional design outlay in terms of manufacturing, make possible the translational guidance of the locking element in the first angular range of the actuating element. In this regard, it is conceivable for example that the pin groove is formed as a groove extending parallel to the axis of the casement lock housing, in order to make possible the translational guidance.

A particularly advantageous refinement of the invention provides that the securing means has at least two securing contours which are formed so as to correspond to one another. The securing contours allow the axial securing and axial release of the actuating element to be realized in a structurally space-saving manner. Particularly advantageously, the securing contours may be formed so as to correspond to one another.

In this regard, it is particularly advantageous if one securing contour is arranged on the actuating element and one securing contour is arranged on the casement lock housing. Through rotational actuation of the actuating element, the securing contours can be in engagement and/or not in engagement such that the actuating element is secured in an axial direction in a correspondingly form-fitting manner and released. In this regard, it is possible for example that the securing contours are formed in the manner of a non-latching bayonet fastener. For the arrangement of the securing contours on the actuating element and casement lock housing, it is furthermore possible for the first securing contour to be formed as an integral feature of the actuating element and for the second securing contour to be formed as an integral feature of the casement lock housing.

In this regard, it has proven to be particularly advantageous if the securing contours are arranged in relation to one another in such a way that the securing contours are in engagement with one another in the first angular range of the actuating element and are not in engagement in the second angular range of the actuating element. This allows a particularly simple assembly of the casement lock to be achieved since the actuating element can be positioned axially in the casement lock housing without the securing contours being in engagement with one another. If, after the axial positioning during the assembly, the actuating element is aligned through rotation within the casement lock housing, then the securing contours come into engagement and the actuating element is secured with respect to the casement lock housing, so that the further assembly of the casement lock can be carried out in a simplified manner.

Furthermore, in relation to the securing contours, it is advantageous if the securing contours have in a circumferential direction in each case at least one fitting opening for fitting of the actuating element in an axial direction to the casement lock housing. This makes it possible in a structurally simple manner for the securing contours to be in engagement in the first angular range and not in engagement in the second angular range.

It has furthermore turned out to be particularly advantageous for one securing contour to be arranged on a face side, facing toward the locking element, of the actuating element, and/or for one securing contour to be arranged on an inner lateral surface of the casement lock housing. In this way, the securing contours of the actuating element and of the casement lock housing can be brought into engagement and/or out of engagement in a structurally simple manner. Moreover, the arrangement of the securing contours on the face side of the actuating element and on the inner lateral surface of the casement lock housing results in a compact construction.

Furthermore, it has proven to be advantageous if the securing contour is in the form of a groove which is arranged on the inner lateral surface and which extends over part of the circumference of the inner lateral surface, and the securing contour is in form of a securing element which engages into the groove, in particular is in the form of a kind of securing hook.

An advantageous configuration of the invention that has proven to be effective in practice provides that the locking element has a casement lock tongue.

In relation to the configuration of the locking element, it is furthermore advantageous if the locking element has an abutment nose for limiting the rotational movement of the locking element. The abutment nose makes it possible to limit the rotational movement of the locking element in that, after the pivoting of the locking element, said abutment nose abuts against the casement lock housing. Therefore, in this regard, it has proven to be advantageous if the casement lock housing has an abutment for abutment of the abutment nose. In this way, the rotational movement, in particular the angle thereof, can be fixed. In relation to the rotational movement of the locking element, it has proven to be particularly effective if said rotational movement corresponds to the second angular range of the actuating element, in particular 90°.

Moreover, for use of the casement lock in the hygiene sector, it has proven to be extremely effective for the casement lock to have a sealing means, in particular a seal ring, for sealing off the actuating element with respect to the door. In this way, contaminants, such as for example dust or moisture, can be prevented from passing into the interior of the casement lock housing. Annular flat seals are in particular possible as sealing means. It may be particularly advantageous if, during the assembly, the sealing means is squeezed slightly by the actuating element, so that the sealing action can be increased.

It is particularly advantageous for the actuating element to have a bearing region for areal abutment of the actuating element against the sealing means. The bearing region provides for uniform areal abutment of the actuating element against the sealing means, so that the sealing action can be achieved. It is structurally particularly expedient for the bearing region to be formed as an integral feature of the actuating element.

For the fastening of the casement lock housing to the door, it is particularly advantageous if the casement lock housing has an outer thread. Via said outer thread, the casement lock housing can be screwed to the door. In this case, it is possible in particular for the casement lock housing to be plugged through an opening in the door and subsequently secured with the aid of a nut via the outer thread.

A further advantageous, intuitively operable configuration is distinguished in that the first angular range and the second angular range of the actuating element are of equal size. The actuating element can be moved continuously in rotation in one movement in the first angular range and in the second angular range. In the first angular range, the translational axial movement of the locking element can be achieved through the rotational actuation of the actuating element. In the second angular range, the rotational movement of the locking element can be achieved through the rotational actuation of the actuating element, as is also known to the user already from other turn-and-brace locks too.

BRIEF DESCRIPTION OF THE DRAWINGS

Further details and advantages of casement locks according to the invention will be discussed below on the basis of an exemplary embodiment with the aid of the appended drawings. In the drawings.

DETAILED DESCRIPTION

Figures 1A, 1B:
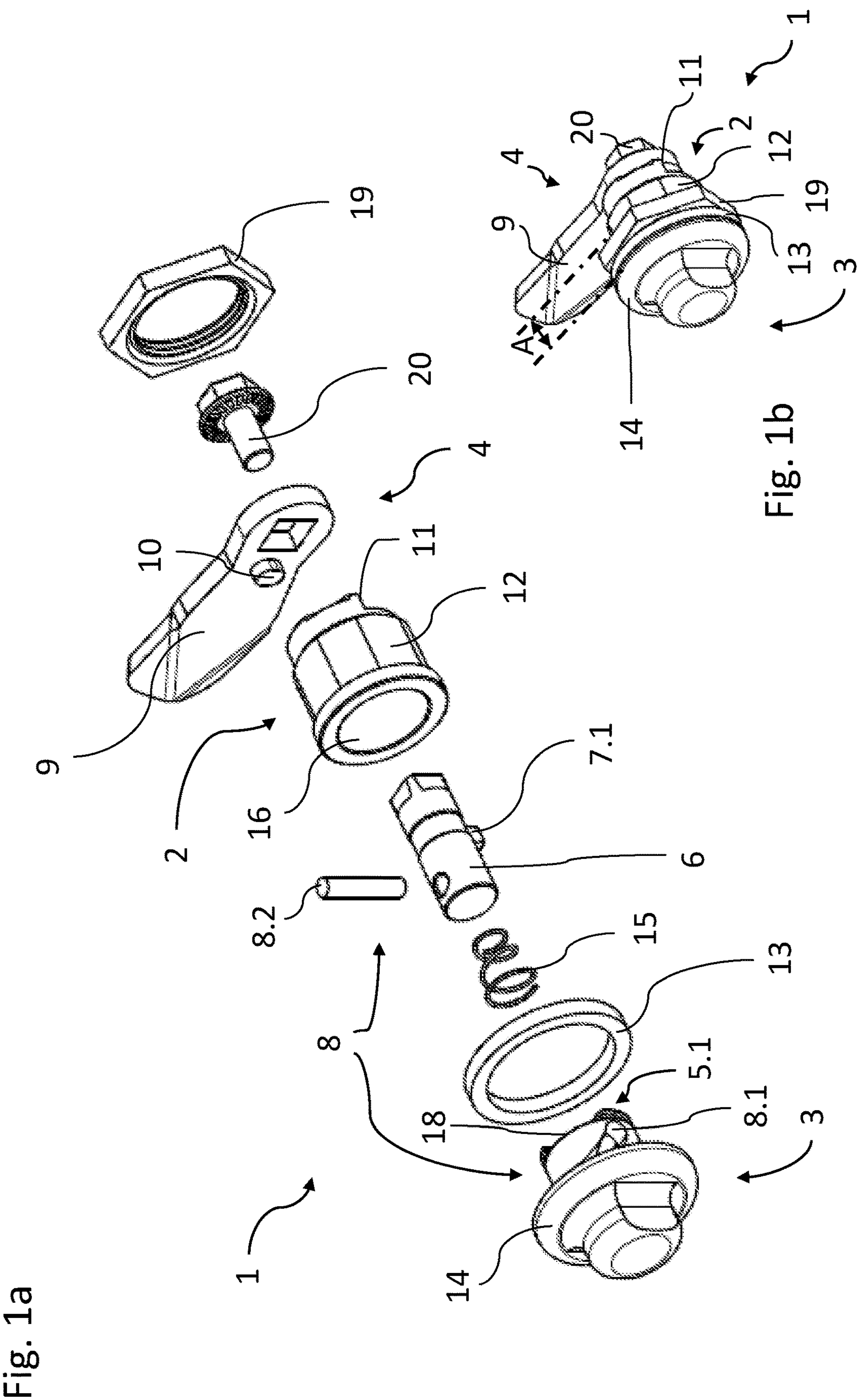
FIGS. 1*a*, 1*b* show an exemplary embodiment of a casement lock according to the invention in an exploded illustration and in an assembled state in a perspective view.

The casement locks 1 illustrated in the figures are used in various technological fields and are suitable in particular for locking doors 100 whose seals are compressed during the locking.

In order to lock the door 100, the actuating element 3 is actuated through rotation. Consequently, firstly a locking element 4 designed in the manner of a locking tongue is moved in a rotational manner, whereupon the door leaf of the door can no longer be opened. Subsequently, the locking element 4 is moved in a translational manner, whereby the door leaf is braced against the door frame and a door seal arranged between door leaf and door frame is compressed. In this regard, casement locks of this type are also referred to as “turn-and-brace locks”.

The casement lock 1 is actuated by a user manually by hand. For this purpose, the actuating element 3, which is accessible to the user from one side of the door 100, is actuated in a rotational manner. In the exemplary embodiment, the rotational actuation may be carried out for example by way of an appropriate tool or a key. The use of fixedly mounted handles, pivoting handles or similar elements is also conceivable, however.

The actuating element 3 can be actuated over an actuation angle of in total 180°. The actuation angle is subdivided into a first angular range α and a second angular range β. In the exemplary embodiment, the angular ranges α, β are each 90° in size, wherein different angular ranges α, β are also possible. It would also be conceivable for the actuation angle to be configured to be greater than or less than 180°.

In the locked state of the door 100, the locking element 4 is firstly moved in a translational manner through the actuation of the actuating element 3 in the first angular range α (cf. also FIGS. 3a and 3b and 4a and 4b). Upon further actuation of the actuating element 3, the locking element 4 is moved in a rotational manner in the second angular range β (cf. also FIGS. 3b and 3c and 4b and 4c). Consequently, for the opening, or also unlocking, process of the casement lock 1, it follows that the locking element 3 is firstly moved axially and is then pivoted. For the locking process of the door 100 with the casement lock 1, the movement sequence which is reversed in relation to the unlocking process results.

In order for the actuating element 3 not to be over-rotated during the locking process, the locking element 4 has an abutment nose 10 which can correspondingly abut against an abutment 11 of the casement lock housing 2. In the other direction, too, an abutment which limits the actuation angle is provided.

The actuating element 3 and the locking element 4 are connected to one another via a mechanism 8 and a coupling shaft 6.

At its locking-element-side end, the coupling shaft 6 is connected fixedly to the locking element 4. The connection is a form fit. The connection is secured via a screw 20. At the actuating-element-side end, the coupling shaft 6 is coupled to the actuating element 3 via the mechanism 8.

The mechanism 8 transmits the rotational movement of the actuating element 3 to the coupling shaft 6 and thus the locking element 4. The mechanism 8 has on the actuating element 3 a first mechanism part 8.1, which is in the form of a guide slot, and has on the coupling shaft 6 a second mechanism part 8.2, which is in the form of a driver. The driver and the guide slot of the mechanism 8 are in engagement such that the movement of the actuating element 3 can be transferred into the movement of the locking element 4.

For this purpose, the guide slot 8.1 is oriented obliquely with respect to the axis of rotation of the actuating element 3, and is arranged so as to be rotatable, but axially fixed, together with the actuating element 3. In the first angular range α, the driver 8.2 is arranged so as to be non-rotatable, but axially movable with the coupling shaft 6. During the rotation of the actuating element 3, the guide slot 8.1 rotates over the rotationally fixedly arranged driver 8.2 such that the axial component thereof provides for a corresponding axial movement of the driver 8.2.

In order for the driver 8.2 to be held in a rotationally fixed manner in the first angular range α of the actuating element 3, the coupling shaft 6 has a guide pin 7.1. The guide pin 7.1 extends transversely to the axis of the coupling shaft 6, that is to say in a radial direction. The guide pin 7.1 forms, together with a correspondingly formed pin groove 7.2, a linear guide which is in the form of a pin guide 7. The pin guide 7 serves for the translational guidance of the coupling shaft 6, and thus of the locking element 4, in the first angular range α. The pin groove 7.2 is formed as a feature of a casement lock housing 2 and runs parallel to the axis of the latter (cf. FIGS. 6a, 6b).

The length of the pin groove 7.2 corresponds to the axial component of the oblique guide slot 8.1, that is to say the axial extent of the guide slot 8.1. In this way, in the first angular range α, the locking element 4 is prevented from rotational movement and is moved exclusively in a translational manner until the guide pin 7.1, upon the second angular range β being reached, exits the pin groove 7.2 and enables the rotational movement. In this position, the driver 8.2 has reached an end of the guide slot 8.1, and for this reason the coupling shaft 6 follows the rotational movements of the actuating element 3. In this way, the locking element 4 can then be rotated until the open position thereof has been reached.

The casement lock housing 2 is arranged between the actuating element 3 and the locking element 4 and protects the coupling shaft 6, which is received in its interior, and the mechanism 8 from external environmental influences. The mechanism 8 is completely surrounded by the casement lock housing 2 irrespective of the rotational position of the actuating element 3, that is to say irrespective of whether the latter is in the first angular range α or in the second angular range β (cf. also FIGS. 3a, 3b, 3c and 4a, 4b, 4c). The coupling shaft 6 is received only partially by the casement lock housing 2 and, in the first angular range α, moves likes a telescopic rod in relation to the casement lock housing 2.

The actuating element 3 is mounted in a rotatable and axially fixed manner on the casement lock housing 2.

A securing means 5 is provided for axially securing the actuating element 3. The securing means 5 serves for axially securing the actuating element 3 in its first angular range α and for axially releasing it in its second angular range β. In the first angular range α, the locking element 4 is moved in a translational manner via the mechanism 8, for which purpose it is necessary for the actuating element 3 to be axially secured. The securing means 5 serves for this purpose. In the second angular range β, in which the locking element 4 is pivoted, the actuating element 3 is likewise in a state in which it is axially secured, but not via the securing means 5. In the second angular range β, the actuating element 3 is axially secured indirectly via the coupling shaft 6 in that an element which can be rotated with the coupling shaft 6 pivots behind an element arranged on the casement lock housing 2.

In the exemplary embodiment, the axial securing of the actuating element 3 in the second angular range β is realized via the guide pin 7.1. As soon as said guide pin has left the pin groove 7.2, it is pivoted together with the coupling shaft 6 and the locking element 4. In the process, the guide pin 7.1 ends up in abutment behind an axial face surface of the casement lock housing 3 and in this way provides for axial securing.

The result is a kind of staggered securing of the actuating element 3 without interruption, which actuating element is secured via the securing means 5 in the first angular range α and via the guide pin 7.1 in the second angular range β.

The release of the actuating element 3 in the second angular range β allows a structurally simple and easy-to-assemble construction of the casement lock 1, which will become even clearer below in the description of the processes during the assembly of the casement lock 1.

The securing means 5 has two securing contours 5.1, 5.2. The first securing contour 5.1 is arranged on a locking-element-side face side 18 of the actuating element 3 and is formed as an integral feature thereof (cf. also FIGS. 5*a*, 5*b*). The second securing contour 5.2 is arranged on the inner lateral surface 16 of the casement lock housing 2 and is likewise formed as an integral feature thereof (cf. FIGS. 6*a*, 6*b*).

At the assembly stage for the casement lock 1, first of all a sealing means 13 may be pushed onto the actuating element 3 (cf. FIG. 1*a*). The sealing means 13 serves, at the door 100, for sealing between the door 100 and the actuating element 3 in the assembled state of the casement lock 1. In particular if the casement lock 1 is used in the hygiene sector, contaminants, germs, dust, moisture or the like can, in a simple and reliable manner, be kept away from an area with high hygiene requirements.

The coupling shaft 6 is connected to the actuating element 3 via the mechanism 8. The coupling shaft 6 is pushed into the actuating element 3 and, during the subsequent connection of the second mechanism part 8.2 to the coupling shaft 6, is connected by way of plugging into the guide slot 8.1 to the actuating element 3.

In order to make possible play-free transmission of the movement of the actuating element 3 to the coupling shaft 6, and thus also to the locking element 4, via the mechanism 8, the actuating element 3 is preloaded with respect to the coupling shaft 6 by means of a spring 15. For this purpose, the spring 15 is arranged between actuating element 3 and coupling shaft 6. The spring 15 is in the form of a compression spring, so that, in an axial direction, the actuating element 3 is preloaded with respect to the coupling shaft 6 in such a way that the second mechanism part 8.2 is in engagement with the first mechanism part 8.1.

The actuating element 3, which is fitted to the coupling shaft 6, is then pushed into the casement lock housing 2. For this purpose, the actuating element 3 is oriented in relation to the casement lock housing 2 in such a way that the securing contours 5.1, 5.2 are not in engagement when the actuating element 3 is pushed axially into the casement lock housing 2, so that said securing contours can be pushed past one another. If the actuating element 3 is subsequently rotated in the casement lock housing 2, then the securing contours 5.1, 5.2 come into engagement and the actuating element 3 is axially secured with respect to the casement lock housing 2. Owing to the axial securing, the actuating element 3 remains in the casement lock housing 2 even before the further fitting of the locking element 4, so that, during the fitting, the actuating element 3, with coupling shaft 6 included, does not necessarily need to be held in the casement lock housing 2 until the fitting of the locking element 4. The result, in this regard, is a significantly simplified assembly of the casement lock 1.

In order to fit the casement lock to the door, the casement lock housing 2 is plugged through an opening in the door 100 and is fastened to the latter by way of the nut 19 via the outer thread 12 of the casement lock housing 2. Finally, the locking element 4 is connected in a form-fitting manner to the coupling shaft 6, in that the locking element 4 is plugged onto the coupling shaft 6, and is secured via the screw 20. The casement lock 1 is then in a state fully fitted to the door 100.

The exact functioning principle of the casement lock 1 will now be discussed once again in more detail on the basis of the unlocking process. In the case of the locking process, the individual steps take place analogously in reverse order.

Figure 2A:
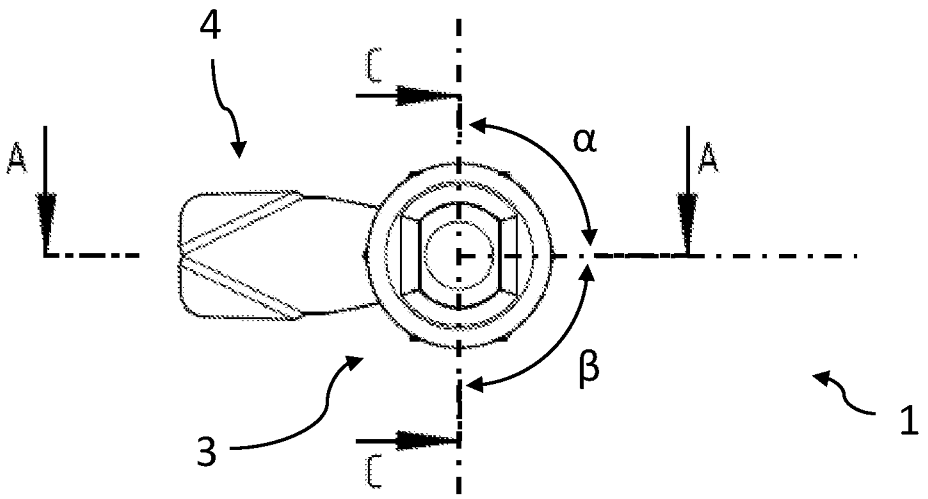
FIGS. 2*a*, 2*b*, 2*c* show plan views of the casement lock in various positions.
Figure 2B:
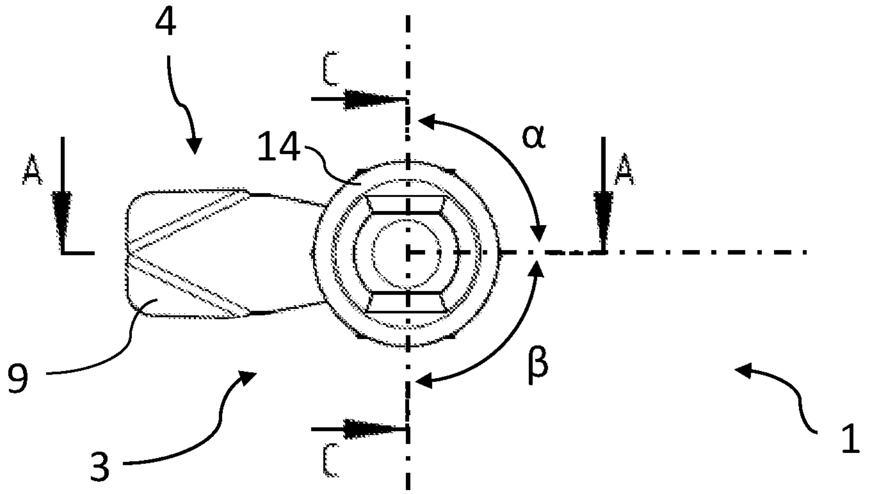
Figure 2C:
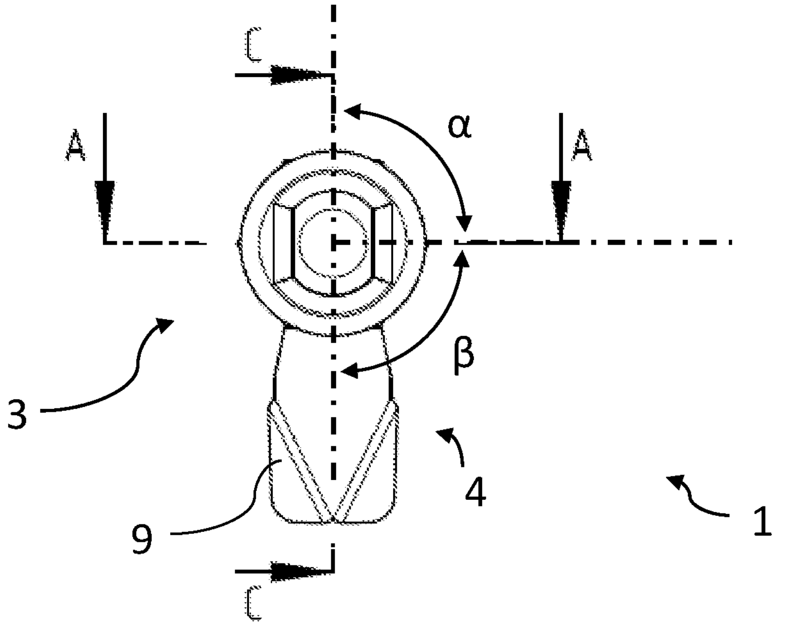

The illustrations in FIGS. 2*a*, 2*b* and 2*c* show the casement lock 1 in different positions, in each case in the front view.

FIG. 2*a* shows a first position of the casement lock 1. In said first position, the door 100 is locked and braced. The actuating element 3 is correspondingly in the starting position. Below, said first position of the casement lock 1, in association with the subsequent figures, will be referred to as "locked position".

FIG. 2*b* shows a second position of the casement lock 1. In this position, the actuating element 3 has been actuated in the first angular range α, such that the locking element 4 has been moved in a translational manner, that is to say telescoped. In the exemplary embodiment, the first angular range α of the actuating element 3 corresponds to 90°, wherein, here, different sizes of the first angular range α are also possible. In this regard, the actuating element 3 has been rotationally actuated through 90° proceeding from the locked position. In said second position of the casement lock 1, the door 100 is still engaged behind by the locking element 4, but is no longer braced. The second position of the casement lock 1 will be referred to below as "telescoped position".

FIG. 2*c* shows a third position of the casement lock 1, in which the actuating element 3 has been actuated through a further 90° in the second angular range β, such that the locking element 4 has been correspondingly pivoted through 90°. In the casement lock 1, the rotational movement of the actuating element 3 in the second angular range β is converted in a one-to-one manner into the rotational movement of the locking element 4 by the mechanism 8. Consequently, in this exemplary embodiment of the casement lock 1, the pivoting angle of the locking element 4 corresponds exactly to the second angular range β of the actuating element 3. In the third position of the casement lock 1, the door 100 is in an unlocked state and can be correspondingly opened. This position will be referred to below as "open position".

The functioning principles of the mechanism 8 and of the securing means 5 will now be discussed on the basis of FIGS. 3*a*, 3*b* and 3*c* and FIGS. 4*a*, 4*b* and 4*c*.

Figure 3A:
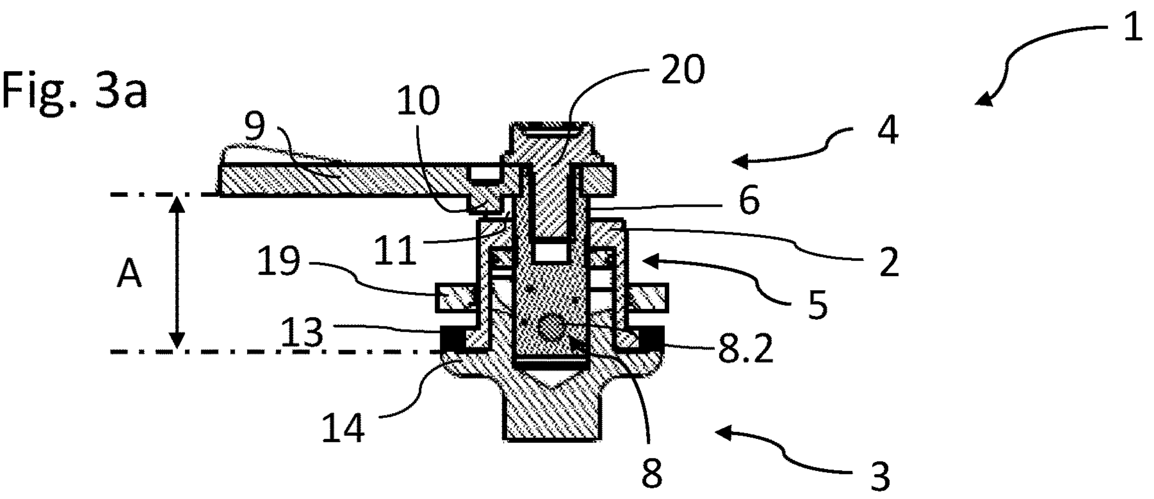
FIGS. 3*a*, 3*b*, 3*c* show sectional views of the casement lock according to the sections denoted by A-A in FIGS. 2*a*, 2*b*, 2*c*, FIGS. 4*a*, 4*b*, 4*c* show sectional views of the casement lock according to the sections denoted by C-C in FIGS. 2*a*, 2*b*, 2*c*, FIGS. 5*a*, 5*b* show the actuating element in perspective views.
Figure 3B:
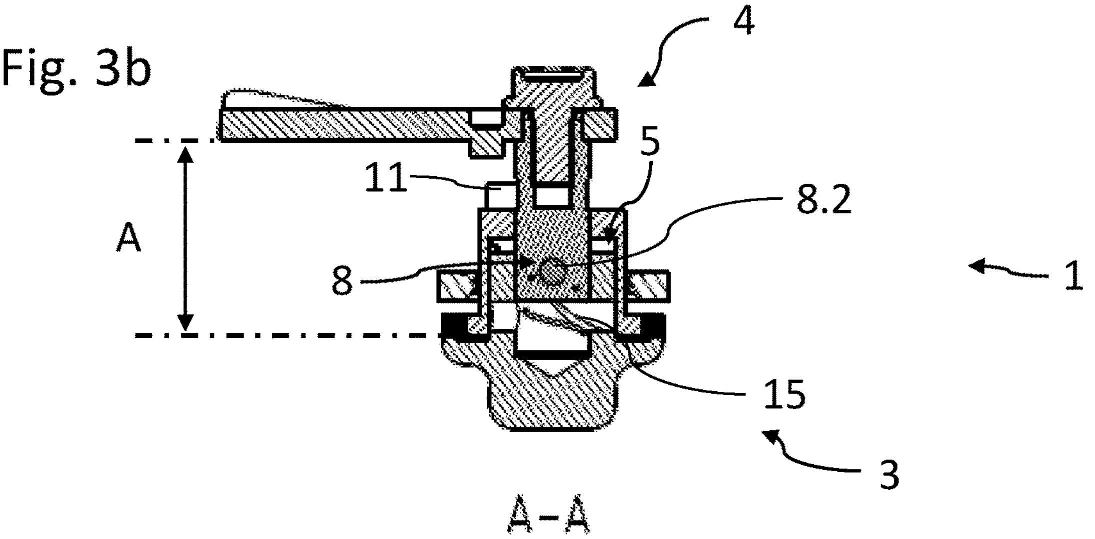
Figure 4A:
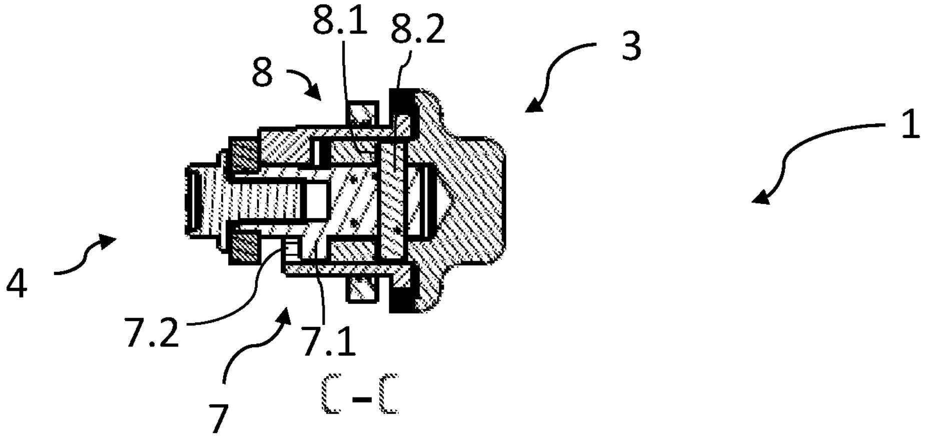

FIGS. 3*a* and 4*a* each show the casement lock 1 in the locked position, correspondingly along the section lines A-A and C-C, respectively. In this state, the locking element 4 has been pulled up to the actuating element 3 to a maximum extent by way of the mechanism 8 via the coupling shaft 6, so that the spacing A between the actuating element 3 and the locking element 4 is minimal.

In the locked position, the abutment nose 10 abuts against the abutment 11 of the casement lock housing 2 (cf. FIG. 3*a*). Furthermore, the guide pin 7.1 is in engagement with the pin groove 7.2 and is correspondingly guided by the latter.

In the locked position, the securing means 5 axially secures the actuating element 3 in that the securing contours 5.1, 5.2 are in engagement with one another. In this case, the securing contour 5.1 of the actuating element 3 engages, in the manner of a non-latching bayonet fastener, behind the securing contour 5.2 of the casement lock housing 2 such that the fastening means 3 is secured, and is correspondingly immovable, in an axial direction with respect to the casement lock housing 2.

If, proceeding from the locked position as per FIGS. 3*a*, 4*a*, the actuating element 3 is then rotationally actuated in the first angular range α, the locking element 4 moves in a translational manner along the axis of the casement lock 1. In this case, the spacing A between the actuating element 3 and the locking element 4 is enlarged (cf. FIGS. 3*b*, 4*b*).

The conversion of the rotational movement of the actuating element 3 into the translational movement of the locking element 4 is made possible by the mechanism 8 in interaction with the pin guide 7. When the actuating element 3 is actuated, the first mechanism part 8.1 is co-rotated. The second mechanism part 8.2, which is guided in said first mechanism part 8.1, is correspondingly driven and guided along the guide slot. The guided movement of the second mechanism part 8.2 is transmitted, owing to the form fit, correspondingly to the coupling shaft 6 and to the locking element 4, which is coupled to the coupling shaft 6. In order for the rotational movement of the guide slot, that is to say the first mechanism part 8.1, into the translational movement of the driver, that is to say the second mechanism part 8.2, to be achieved, "co-rotation" of the driver in the first angular range α must be prevented by the pin guide 7.

Figure 4B:
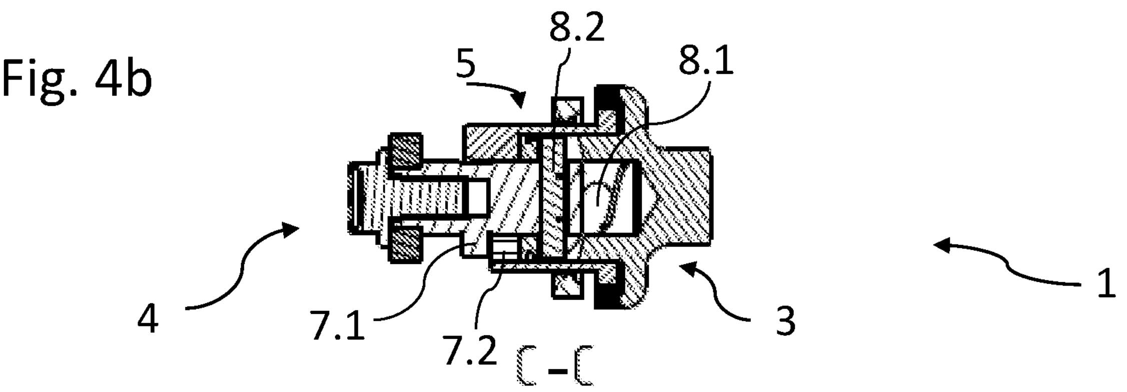
Figure 4C:
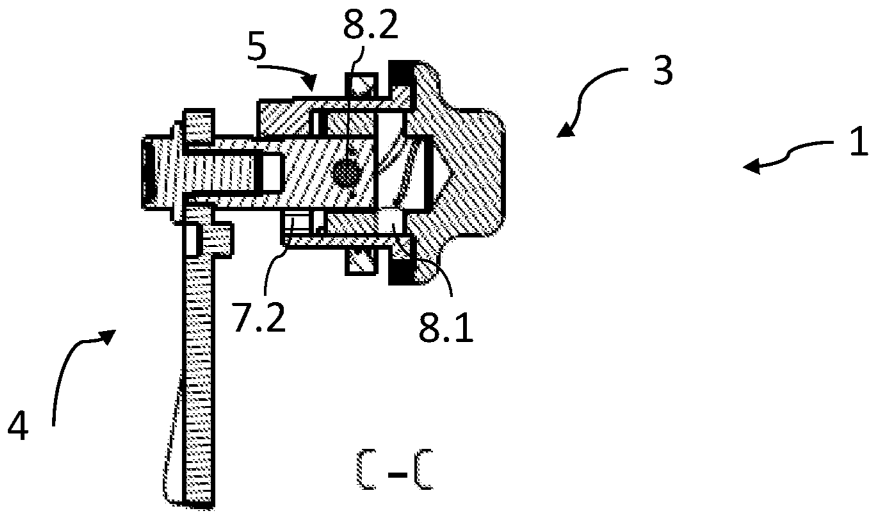

For this reason, the guide pin 7.1 is guided in the pin groove 7.2 in the first angular range α (cf. FIGS. 4*a* and 4*b*). The pin groove 7.2, which is arranged in the casement lock housing 2, is formed here in such a way that the guide pin 7.1 is guided axially, so that the coupling shaft 6, together with the locking element 4, is correspondingly moved in a translational manner. As soon as the casement lock 1 is in the telescoped position as per FIGS. 3*b* and 4*b*, the translational movement of the locking element 4 is complete and the guide pin 7.1 is no longer in engagement with the pin groove 7.2 (cf. FIG. 4*b*).

The spacing A is enlarged during the translational movement of the locking element 4. Since the actuating element 3 is mounted merely rotatably in the casement lock housing 2, it is necessary for axial movement of the actuating element 3 to be prevented during the translational movement of the locking element 4. In order for the actuating element 3, together with the locking element 4 coupled thereto, to be prevented from being able to be displaced back and forth in the first angular range α, the securing means 5 axially secures the actuating element 3 with respect to the casement lock housing 2. In this case, the securing is realized through the engagement of the securing contour 5.1 of the actuating element 3 with the securing contour 5.2 of the casement lock housing 2 (cf. FIG. 4*b*).

Figure 3C:
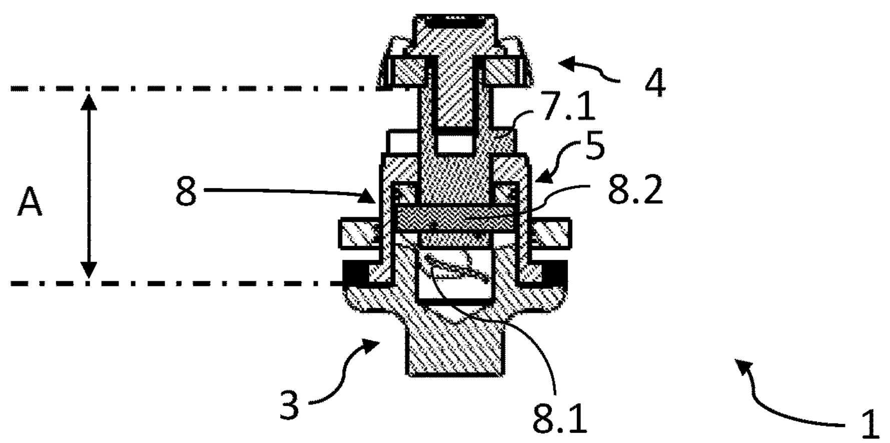

If, proceeding from the telescoped position, the actuating element 3 is rotationally actuated further in the second angular range β, then the locking element 4 is pivoted (cf. FIG. 3*c*). In the exemplary embodiment, the pivoting angle of the locking element 4 corresponds to 90° and is thus exactly the same size as the second angular range β of the actuating element (cf. also FIG. 2*c*). During the rotational movement of the locking element 4, the spacing A between the actuating element 3 and the locking element 4 remains unchanged.

In the second angular range β, the actuating element 3 is in a state axially released via the securing means 5, such that the securing contours 5.1, 5.2 are not in engagement. However, during the actuation in the second angular range β, the actuating element 3 is still axially immovable with respect to the casement lock housing 2, since the guide pin 7.1 engages behind the casement lock housing 2 owing to the pivoting (cf. FIGS. 3*b* to 3*c* and 4*b* to 4*c*). The axial release of the actuating element 3 with respect to the casement lock housing 2 allows, in particular, simplified assembly of the casement lock 1, as will be discussed on the basis of the subsequent FIGS. 5*a*, 5*b* and 6*a*, 6*b*.

Figure 5A:
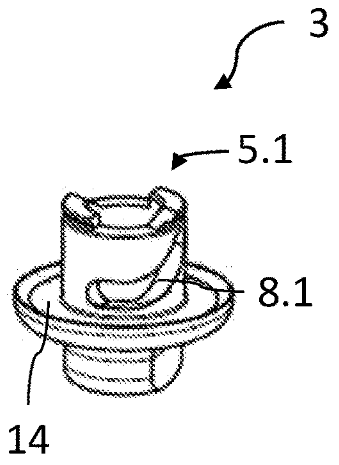
Figure 5B:
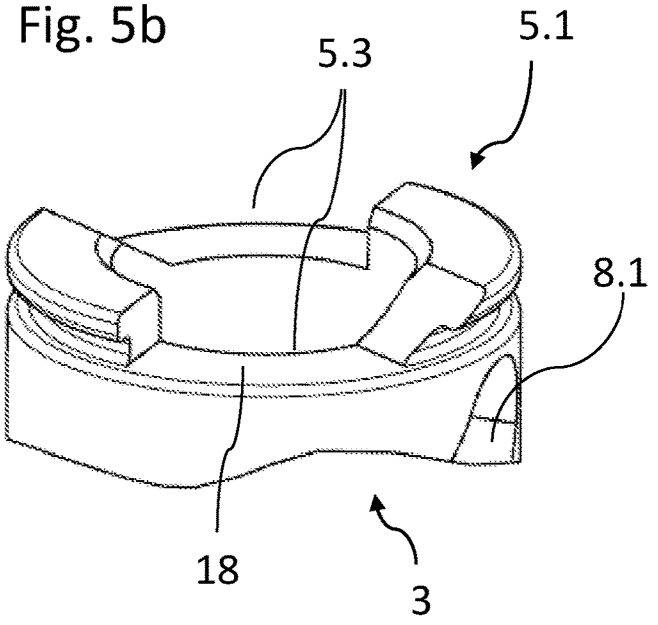

FIGS. 5*a* and 5*b* show in detail views the actuating element 3 and the securing contour 5.1 which is arranged on the face side 18.

The securing contour 5.1 is formed on the face side 18 of the actuating element 3 as an integral feature of said face side. Owing to the arrangement of the face-side securing contour 5.1, it is, in a structurally simple manner, able to be brought into or out of engagement with the corresponding securing contour 5.2 in the assembled state of the casement lock 1 through rotation of the actuating element 3 in the casement lock housing 2.

The securing contour 5.1 has, for the purpose of fitting the actuating element 3, two fitting openings 5.3 which are situated opposite one another in a circumferential direction. In this case, the fitting openings 5.3 each extend over an angle of approximately 90°, so that the securing contour 5.1 is subdivided into four sections of approximately equal size. Here, it would also be possible for the fitting openings 5.3 to have an angle different from 90°.

Figure 6A:
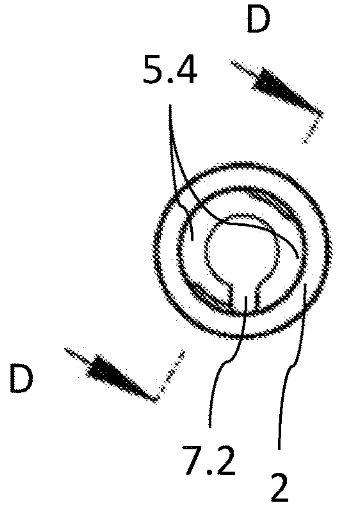
FIGS. 6a, 6b show the casement lock housing in a front view and in a sectional view according to the section denoted by D-D in FIG. 6a, and FIG. 7 shows the casement lock housing with actuating element arranged therein in a sectional view.
Figure 6B:
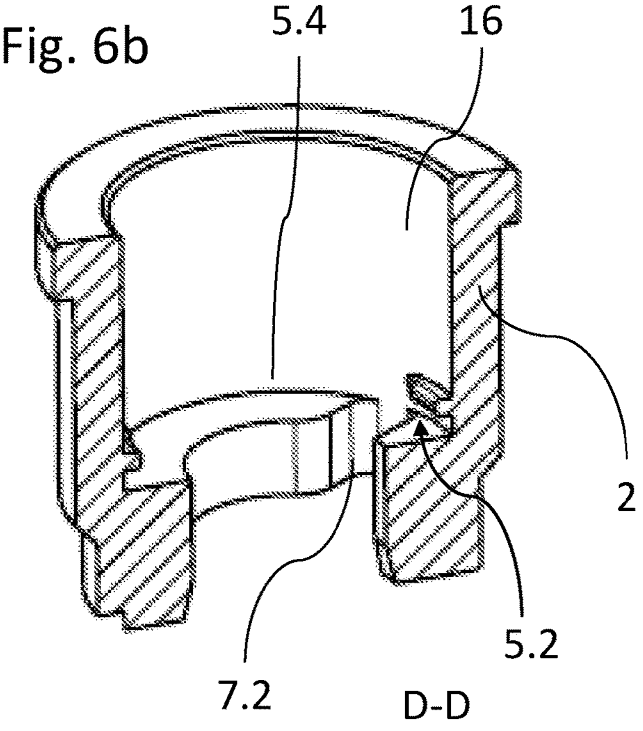
Figure 7:
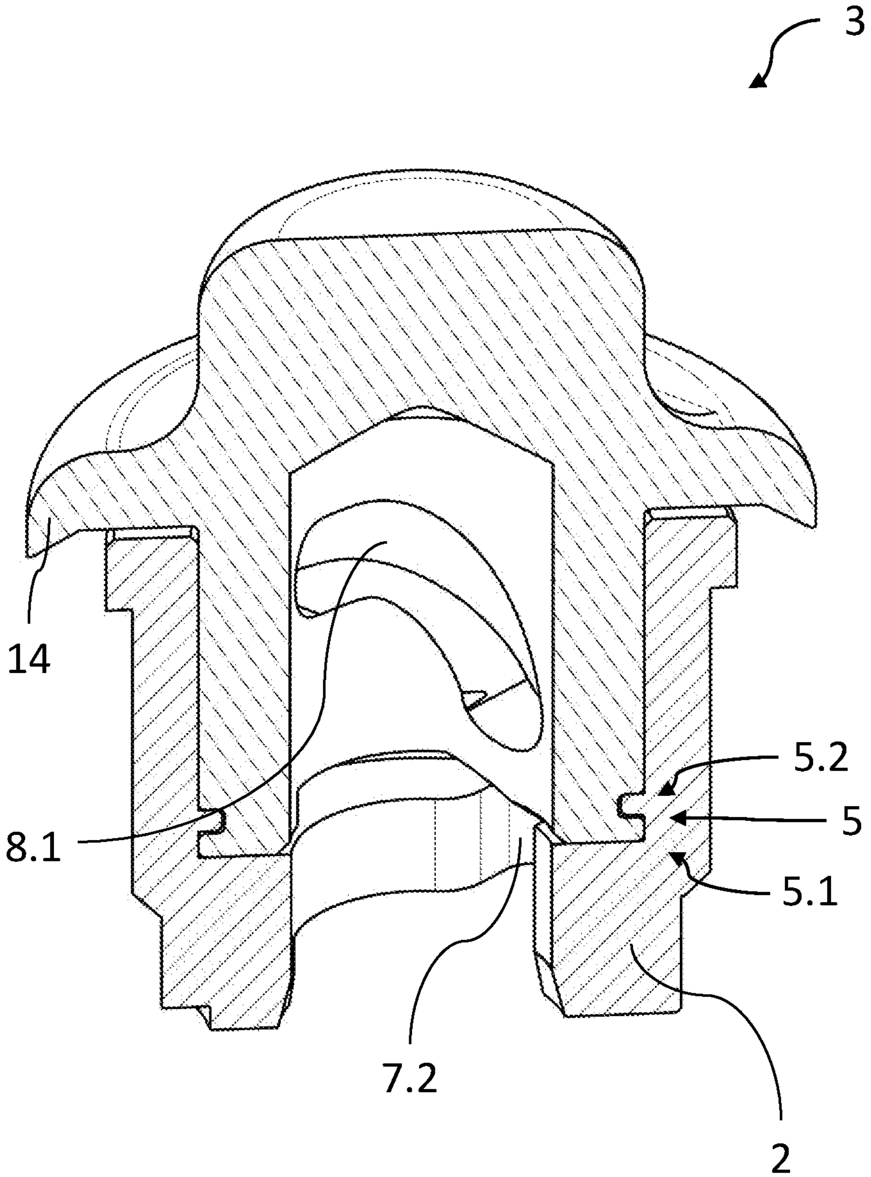

FIGS. 6*a* and 6*b* show the casement lock housing 3 in a plan view and also in a sectional view along the section line D-D.

The securing contour 5.2 is arranged peripherally on the inner lateral surface 16 of the casement lock housing 2. Just like the securing contour 5.1 of the actuating element 3, the securing contour 5.2 also has two oppositely situated recesses 5.4. However, the recesses 5.4 extend over a wider angle of in each case approximately 135°, wherein, here too, different angles are possible.

The design of the securing contours 5.1 and 5.2 is such that the actuating element 3 is plugged into the casement lock housing 2 and, through subsequent rotation, the securing contours 5.1, 5.2 are brought into engagement in a simple manner so as to axially secure the actuating element 3 in the casement lock housing 2.

By virtue of the fact that the actuating element 3 is, with respect to the casement lock housing 2, in a state correspondingly axially secured via the securing means 5 in the first angular range α and in a state axially released via the securing means 5 in the second angular range β, the securing means 5 makes it possible to realize a simply constructed and easy-to-assemble casement lock 1. Since the actuating element 3 is arranged on the casement lock housing 2 in an axially immovable manner, the casement lock 1 is also particularly suitable for applications in the hygiene sector.

REFERENCE SIGNS

1 Casement lock
2 Casement lock housing
3 Actuating element

4 Locking element
5 Securing means
5.1 Securing contour
5.2 Securing contour
5.3 Fitting opening
5.4 Fitting opening
6 Coupling shaft
7 Pin guide
7.1 Guide pin
7.2 Pin groove
8 Mechanism
8.1 Mechanism part
8.2 Mechanism part
9 Casement lock tongue
10 Abutment nose
11 Abutment
12 Outer thread
13 Sealing means
14 Bearing region
15 Spring
16 Inner lateral surface
17 Securing means
18 Face side
19 Nut
20 Screw
100 Door
α First angular range
β Second angular range
A Spacing

The invention claimed is:

1. A casement lock for locking a door, the casement lock comprising:

a casement lock housing;

an actuating element which is mounted rotatably on the casement lock housing and having a locking element which is coupled to the actuating element and which is movable in a translational manner through a first angular range of the actuating element and in a rotational manner through second angular range of the actuating element; and securing means, wherein the actuating element is, with respect to the casement lock housing, positionable in a state axially secured via the securing means in the first angular range in which the actuating element is prevented from being able to be displaced back and forth in the axial direction, and in a state axially released via the securing means in the second angular range.

2. The casement lock as claimed in claim 1, further comprising a coupling shaft, wherein the actuating element is coupled to the locking element via the coupling shaft.

3. The casement lock as claimed in claim 2, further comprising a mechanism, wherein, for the purpose of generating the translational and rotational movement of the locking element, the actuating element is coupled to the coupling shaft via the mechanism.

4. The casement lock as claimed in claim 3, wherein the mechanism has an actuating-element-side first mechanism part and a coupling-shaft-side second mechanism part.

5. The casement lock as claimed in claim 4, wherein the first mechanism part is in the form of a guide slot and the second mechanism part is in the form of a driver which can be moved via the guide slot.

6. The casement lock as claimed in claim 3, wherein the mechanism is arranged completely within the casement lock housing.

7. The casement lock as claimed in claim 2, further comprising a compression spring, wherein the coupling shaft is preloaded with respect to the actuating element via the compression spring.

8. The casement lock as claimed in claim 2, further comprising a pin guide that provides translational guidance of the locking element in the first angular range of the actuating element.

9. The casement lock as claimed in claim 8, wherein the pin guide includes a guide pin which is arranged on the coupling shaft and which is oriented transversely to the shaft axis thereof.

10. The casement lock as claimed in claim 9, wherein the casement lock housing includes a pin groove, and the guide pin engages the pin groove in the first angular range.

11. The casement lock as claimed in claim 1, wherein the securing means includes at least two securing contours which are formed to correspond to one another.

12. The casement lock as claimed in claim 11, wherein one of the at least two securing contours is arranged on the actuating element and the other of the at least two securing contours is arranged on the casement lock housing.

13. The casement lock as claimed in claim 11, wherein the at least two securing contours are in engagement with one another in the first angular range of the actuating element and are not in engagement in the second angular range of the actuating element.

14. The casement lock as claimed in claim 11, wherein one of the at least two securing contours has in a circumferential direction at least one fitting opening for fitting the actuating element in an axial direction to the casement lock housing.

15. The casement lock as claimed in claim 11, wherein one of the at least two securing contours is arranged on a face side of the actuating element, facing toward the locking element, and/or one of the at least two securing contours is arranged on an inner lateral surface of the casement lock housing.

16. The casement lock as claimed in claim 15, wherein one of the at least two securing contours is in the form of a groove which is arranged on the inner lateral surface and which extends over part of a circumference of the inner lateral surface, and wherein the one of the at least two securing contours is in form of a securing hook which engages the groove.

* * * * *